Figure 1:
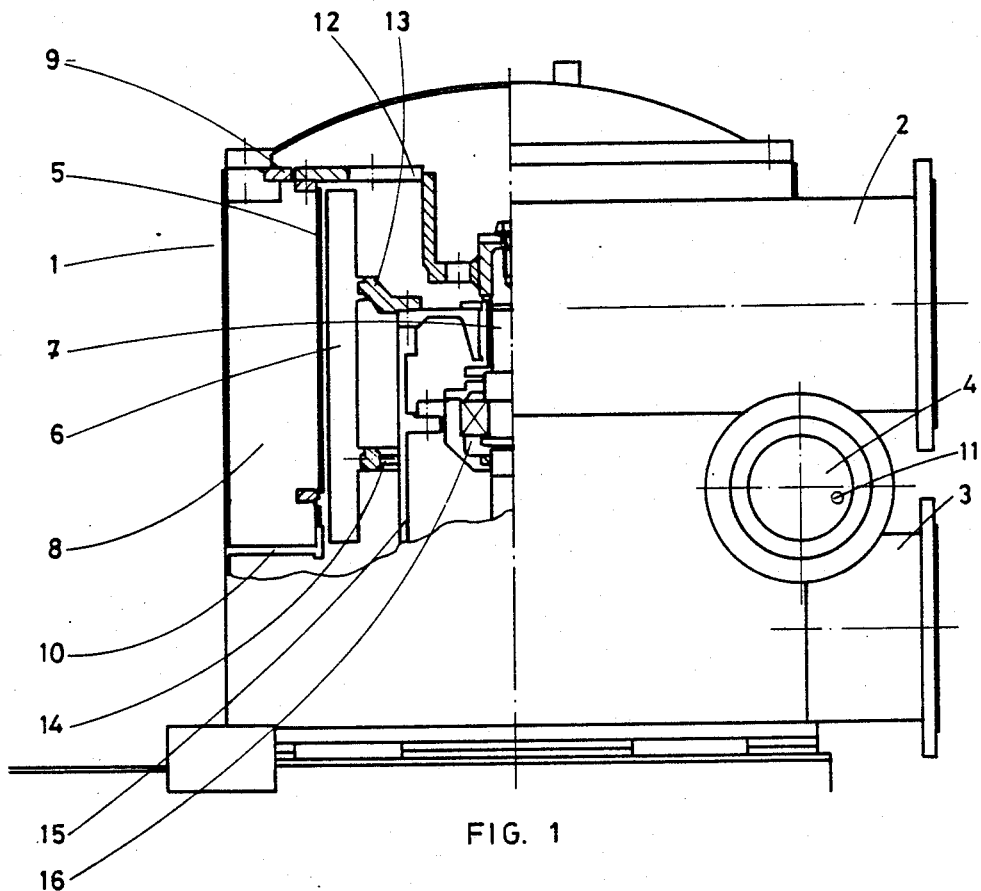

United States Patent [19]

Henricson et al.

[11] Patent Number: 4,927,529
[45] Date of Patent: May 22, 1990

[54] METHOD AND APPARATUS FOR SEPARATING KNOTS

[75] Inventors: Kaj O. Henricson, Kotka; Erkki T. Repo, Lappeenranta; Hannu U. Rönkönharju, Kyminlinna, all of Finland

[73] Assignee: A. Ahlstrom Corporation

[21] Appl. No.: 145,557

[22] Filed: Jan. 19, 1988

[51] Int. Cl.$^5$ .............................................. B07B 1/22
[52] U.S. Cl. .................................. 209/270; 209/304; 209/250; 210/512.1; 210/784; 210/788
[58] Field of Search ............... 209/270, 273, 303, 304, 209/268, 250; 210/512.1, 784, 788, 360.1, 360.2, 378, 354, 402

[56] References Cited

U.S. PATENT DOCUMENTS

| | | | |
|---|---|---|---|
| 2,038,931 | 4/1936 | Goldberg et al. | 209/268 X |
| 2,827,169 | 3/1958 | Cusi | 209/268 X |
| 3,933,649 | 1/1976 | Ahlfors | 209/270 X |
| 3,939,065 | 2/1976 | Einarsson Ahlfors | 209/304 X |
| 4,309,284 | 1/1982 | Morimoto et al. | 209/273 |
| 4,466,862 | 8/1984 | Ring et al. | 209/250 X |

Primary Examiner—Joseph J. Rolla
Assistant Examiner—David H. Bollinger
Attorney, Agent, or Firm—Toren, McGeady & Associates

[57] ABSTRACT

A method of and apparatus for separating knots from a fibre suspension in the wood processing industry. A known problem in the prior art has been the quick wear of the screen surface of the knotter when the screen surface has been profiled. On the other hand the ability to separate with an unprofiled screen has not been satisfactory. When using a profiled screen cylinder (5), it has been noticed in performed tests that it is preferable to feed the pulp from the connections (2) in the direction of rotation of the screen cylinder and also to discharge the reject from connections (4) and the accept from the connections (3) in the direction of rotation of the cylinder (5). Accordingly, there is not only less wear of the screen surface, but also a significantly smaller consumption of power per pulp ton than in the prior art apparatuses.

10 Claims, 3 Drawing Sheets

FIG. 3 (A-A)

METHOD AND APPARATUS FOR SEPARATING KNOTS

The present invention relates to a method and apparatus for separating knots. The method and apparatus are in particular suitable in separating knots from high consistency pulp.

There are several different kinds of knot separators already known. An apparatus is introduced in U.S. Pat. No. 3,947,314 which includes an outer casing, an inner screen casing, of cylindrical configuration, a rotating screw conveyor inside the screen casing and an inlet adjacent the lower end of the screen casing, accept outlet adjacent the lower end of the outer casing and a reject outlet adjacent the upper end of the screen casing. The whole apparatus is preferably slightly inclined in relation to the vertical. The apparatus functions in the way that the pulp including knots or other fairly large pieces of wood is fed to the lower end of the screen casing to be lifted by the screw conveyor. When the screw conveyor lifts the pulp the fine fibers pass through the holes or slots of the perforated casing and are discharged through the accept outlet in the lower end of the outer casing. The coarser material which is not filtered through the holes of the screen casing is carried to the upper end of the screen casing and falls from there to the reject chute.

Another apparatus according to prior art is introduced in SE patent publication 316363 in which there is substantially a slightly conic downwards broadening rotating screen cylinder inside the cylindrical casing. Inside the screen cylinder there are stationary pulsation means arranged to ensure that the openings of the screen cylinder remain open. The pulp is tangentially fed to an annular channel situated at the upper end of the outer casing, of which channel the pulp flows along the horizontal plate arranged on the outer casing spirally towards the shaft of the screen cylinder. In the middle part of the above mentioned plate there is a hole through which the pulp falls down on the end cover of the rotating screen cylinder, which has radial ribs giving the pulp its initial rotational motion. From the cover the pulp is dashed due to the centrifugal force to the downwards narrowing space between the screen cylinder and the outer casing. The fines pass through the screen cylinder to the accept side. The material left over between the outer casing and the screen cylinder, the reject, is discharged finally to an annular channel in the lower end of the outer casing, from where the reject is discharged to the tangential outlet.

As a third arrangement is introduced an apparatus according to the U.S. Pat. Publication No. 4,441,999 which consists of a cylindrical outer casing and a rotating screen cylinder. Inside the screen cylinder there are one or more stationary unrotating blades. The pulp is tangentially fed between the screen cylinder and the outer casing, but opposite to the direction of rotation of the cylinder. The accept is discharged from the inside of the screen cylinder at the end of the cylinder and the reject tangentially, but opposite to the direction of rotation of the cylinder. In accordance with the present arrangement, the screen cylinder consists of openings that open to the inside of the cylinder and of connecting pieces which in principle consist of radial arms and parts bent forward to the direction of the pulp flow coming to the cylinder which produce pressure pulses to the pulp to keep the holes of the screen cylinder open. The apparatus in accordance with this publication was found to operate especially well in paper machine short circulation and equivalent where it enabled the dampening of the fluctuation of the pressure inconvenient to further processing.

The latter two devices are characterized in that they reach the consistency range of 4–6%, whereas the device according to the first example functions only in the consistency of up to 1, 5–2%. Plugging of the holes on the screen surface limits the operation in all devices. Yet, in stock processing the aim is consistently towards higher consistencies, because it is in every respect more preferable to tend to treat the pulp in different process stages in the same consistency without thickening and dilution. If it is possible to raise the processing consistency, savings can be gained in both device and transportation charges and also considerably in the consumption of energy.

An improved method and apparatus for separating knots has been developed on the basis of the description above, which reaches the so called low range of the MC-consistency (6–8%) and diminishes significantly the consumption of energy. The rise of the applicable range of consistency is achieved by the correct measuring and formulation of the screen profile, and optimizing the rotational speed of the cylinder with respect to the feeding speed of the pulp. In addition to that it has been possible to diminish the consumption of energy of the knotter itself essentially compared to the apparatus of the U.S. publication No. 4,441,999. This is mainly due to changing the direction of rotation of the screen cylinder to parallel to the direction of the pulp feed. According to the performed tests the consumption of energy of the knotter of the present invention has been measured to have been at most 0, 6 kWh/mass ton. Furthermore the change of the direction of rotation has diminished the wear of the screen cylinder.

Additionally one advantage of an apparatus in accordance with the present invention is facilitation of reject outlet compared to the approach in accordance with the U.S. Pat. No. 4,441,999, because in the apparatus according to the present invention the reject is discharged in the direction of the rotation of the screen cylinder. This pumping effect together with dilution water led to the reject in the discharge stage significantly facilitates the adjustment of the amount of reject. Thus even with higher consistencies the reject rate can be maintained between 2 to 10% by using the screen in accordance with the present invention.

The method according to the present invention is among other things characterized in that the fibre suspension is tangentially introduced in the direction of rotation of the screen cylinder and the reject is discharged tangentially in the direction of rotation of the screen cylinder.

The apparatus according to the present invention is characterized in that the direction of rotation of the cylinder is parallel to direction of pulp feed from the inlet connection, the direction of the outlet of the reject from the outlet connection is the same as the direction of rotation of the cylinder and that the cylinder is contoured in the way that on the outer surface of the cylinder there are ridges between the openings.

Figure 2:
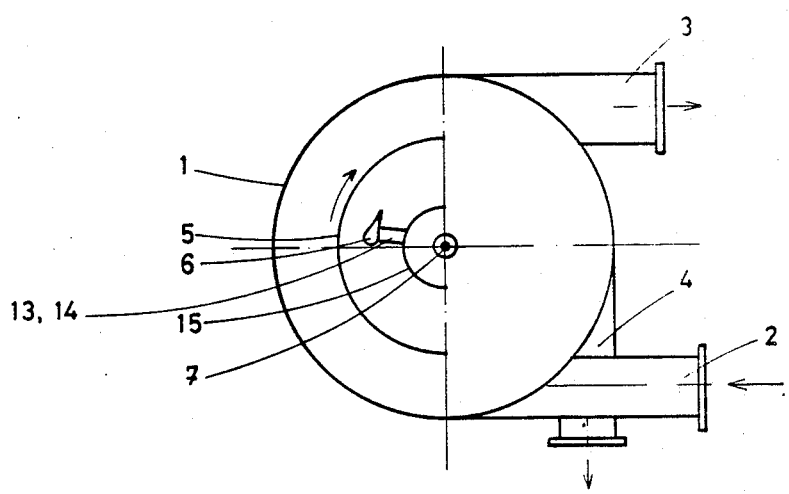
Figure 4:
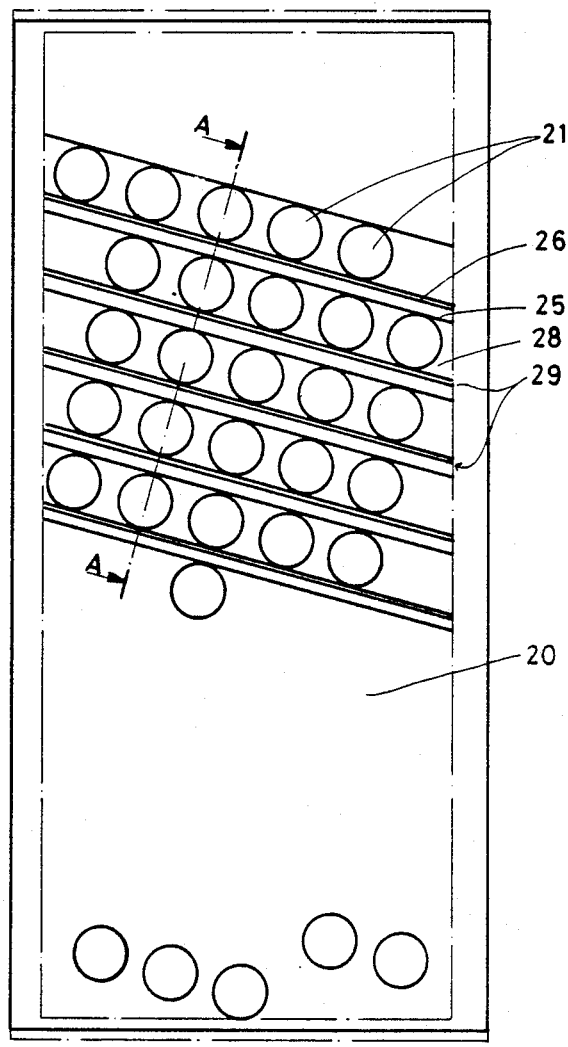

The method and the apparatus according to the present invention are further described with reference to the accompanying drawings, in which FIG. 1 is a partly sectional side view of the apparatus according to the invention, FIG. 2 is a partly sectional top view of an apparatus according to FIG. 1, FIG. 2a is a top view similar to FIG. 2, illustrating the range of angular displacement of a blade, FIG. 3 is a straightened sectional side view of the screen profile according to a preferred embodiment, and FIG. 4 is an over view of the screen according to FIG. 3.

The knotter in FIGS. 1 and 2 of the drawings describes a preferred embodiment of the invention substantially consisting of a cylindrical outer housing 1, in which there is the inlet connection 2 for the pulp, outlet connection 3 for the accept and outlet connection 4 for the reject, screen cylinder 5, and of one or more stationary unrotating blades 6 inside the screen cylinder 5 extending near the surface of the screen cylinder. The screen cylinder 5 is attached by members 12 on the shaft 7 which functions e.g. by belt drive (not introduced). The space 8 between the screen cylinder 5 and the outer housing 1 is annular and sealed at the ends with radial plates 9 and 10 projecting from the outer housing 1 towards the shaft. The above mentioned connections 2 and 4 are tangentially attached to the outer housing 1 of the annular space 8. In addition to that a feed pipe 11 of the dilution water is arranged to the reject connection 4, with which, if necessary, the consistency of the reject is lowered in order to facilitate further screening.

The blades 6 are attached with arms 13 and 14 to a stationary frame 15 which also forms a strut for the shaft 7 through the bearing 16. The blades 6 are positioned in the cylinder 5 so that the blade situated near the reject connection 4 is in the range of ±10° to 45° spaced from the reject connection relative to the direction of rotation of the cylinder 5. Correspondingly, the other blade is ±10° to 45° spaced from the input connection 2. In FIG. 2a, the angular range is illustrated. Thus the above mentioned blades generate the applicable pulse, positive and/or negative, to the cylinder 5.

In FIGS. 3 and 4 there is described an opened screen in accordance with one preferred embodiment. The contoured plate 20 consists of openings 21 and of lands 22 between them. Plate 20 is plain on the inner surface 23 excluding the openings. The outer surface of the plate 20 consists of front surfaces 25 rising in a certain angle from the plane 24 of the plate 20, substantially of the surfaces 26 parallel to the plane 24 of the plate 20, substantially of the end surfaces 27 upright to the plane 24 of the plate 20 and of parts 28 of the plane 24 between the openings 21. On the other hand the screen plate can be considered to consist of a plate which has ridges 29 which consist of the above mentioned parts 25, 26 and 27, and of the plane like parts 28 between them, in which the openings 21 are machined.

As it appears in FIG. 4 the openings 21 are preferably holes (or slots) the diameter of which can range depending on the application at least between 5-15 mm. It also appears in FIG. 4 that the ridges 29 can be slightly declined from the axial direction of the plate. By the declination angle of the ridges, the direction of the declination in respect to the direction of rotation, the speed of rotation and the ascending angle of the part 25 of the ridges the circulation time of the pulp in the knotter can be optimized in relation with the result of the separation. The circumferential speed of the cylinder used in the performed tests has been 4-10 m/s and for the feed of the pulp 2 m/s in the performed experiments. In that case the speed difference between the cylinder and the pulp is 2-8 m/s. The gradient plane 25 of the ridges 29 of the screen plate 20 receives the pulp coming into the cylinder, tending to accelerate its speed. The direction of the ridges 29 has the effect that if the ridges 29 on the screen cylinder 5 are backwards inclined, they tend to raise the pulp upwards in the cylinder, thereby the circulation time of the pulp in the knotter becomes longer, the separation takes place more accurately and the amount of reject diminishes while the amount of accept grows.

If the ridges are forwards inclined the circulation time becomes shorter and the separation is not anymore so accurate. In addition to the above mentioned factors also the height of the screen cylinder effects on the speed, inclination angles, etc. used.

The method and apparatus in accordance with the present invention function in the following way. The pulp is tangentially fed by pressure into the space between the rotating screen cylinder and the outer housing of the knotter and in the same direction as the rotating motion of the screen. The ridges of the screen cylinder subject the infed pulp to circumferential forces for increasing its speed of motion and, due to the shape of the ridges, also shear forces for opening the bonds between the pulp particles, i.e. the fibres. The ridges cause at the outlet end in front of the surface 27 a low pressure zone that attracts the loose fibres through openings 21 with the help of the pressure difference between the inlet connections 2 and the accept connections 3. The heavier particles carried by the pulp sling towards the surface of the housing 1 when hitting the ridges, whereby they are also subjected to the centrifugal force. In that case the lighter particles of the pulp are enriched near the surface of the screen cylinder and are separated from the pulp in the above mentioned way. Due to the contours of the surface of the cylinder a slight fluidization takes place near the surface of the screen cylinder, helping the separation and on the other hand also diminishing the consumption of energy of the separation and the wear of the screen cylinder. The heavy particles separated onto the surface of the outer housing of the knotter circulate down the housing surface along the spiral path and are tangentially discharged from the knotter through the connection 4. The discharge is activated more by feeding, if necessary, dilution water to the reject from the pipe 11.

As already mentioned above, the apparatus in accordance with the invention described above has made it possible to diminish the consumption of energy in respect to the prior art more than 30% and at the same time it has been possible to increase the consistency of the pulp up to the lower range of the MC-consistency. As a byproduct a less wearing screen cylinder and an apparatus better adjustable in its function and in its end products has also been brought about. For example, merely changing the rotational speed of the cylinder it is possible to adjust the apparatus applicable to most different consistencies and different kinds of pulps. When this method is added by a possibility to produce screen cylinders having varying inclination angles of ridges or openings of variable sizes, one is able to talk about an ultimately optimized knotter.

It has to be noticed that above has only been shown one preferred embodiment of the apparatus in accordance with the present invention which may in reality differ a lot from the form shown above and yet not differ from the inventive idea which is more closely described in the accompanying claims. It is namely quite possible that in some case it is necessary to use an inclination angle of two or more ridges or that the speeds of the pulp suspension and the cylinder differ a lot from the example shown above, substantial is, however, only the difference of the speeds which according to the claims is 1-6 m/s.

We claim:

1. A method of separating knots and other solids from a pulp fibre suspension in an apparatus having an upwardly extending outer housing, an upwardly extending screen cylinder having an interior and mounted for rotation within and spaced inwardly from said outer housing and forming an annular space therebetween, said screen cylinder having a contoured outer surface facing the annular space with openings therethrough between the annular space and the interior of the screen cylinder, and at least one blade arranged within the interior of and adjacent said screen cylinder for subjecting said screen cylinder to pressure pulses, comprising the steps of rotating said screen cylinder at a rotational speed;

flowing the fibre suspension to be treated into the apparatus directly into the annular space tangentially to the outer surface of said screen cylinder in the direction of rotation of said screen cylinder at a feed speed less than the rotational speed of the screen cylinder for utilizing the feed speed in carrying out the method;

increasing the feed speed of the fibre suspension by the rotational speed of the screen cylinder and thereby effecting a slight fluidization at the contoured outer surface of the screen cylinder and facilitating the centrifugal separation of knots;

positioning the at least one blade in the range of ±10° to 45° relative to one of an input connection and a reject connection;

flowing an accept of the suspension directly through the screen cylinder into the interior of the screen cylinder flowing in the direction of rotation of the screen cylinder and discharging the accept tangentially from the interior of the screen cylinder in the direction of the rotation of the screen cylinder;

discharging a reject of said suspension from the annular space tangentially of the outer surface of said screen cylinder and in the rotational direction of the screen cylinder and facilitating the discharge of the reject by the rotational speed of the screen cylinder; and subjecting pressure pulses to the screen cylinder from within the screen cylinder for loosening and displacing fibre stuck in the openings of said screen cylinder.

2. A method according to claim 1, including the step of spraying liquid into the reject while discharging the reject for facilitating discharge flow of the reject and diluting the consistency of the reject.

3. Method, as set forth in claim 1, wherein arranging the difference in the rotational speed of the screen cylinder and the feed speed of the fibre suspension in the range of 2 to 8 m/s.

4. An apparatus for separating knots and other solids from a pulp fibre suspension comprising an upwardly extending outer housing having an inlet connection for the fibre suspension flowing therein at a feed speed, an outlet connection for a reject of the suspension and an outlet connection for an accept of the suspension, an upwardly extending single screen cylinder located within and spaced inwardly from said housing and forming therebetween an annular space, said screen cylinder having an upwardly extending axis and being rotatable about said axis, said screen cylinder having openings therethrough from the annular space to the interior space of said screen cylinder and having a contoured outer surface, said screen cylinder being rotatably mounted within said outer housing, means for rotatably mounting said screen cylinder for moving at a rotational speed in excess of the suspension inlet feed speed and including a shaft located within and spaced inwardly from said screen cylinder and at least one blade located in a stationary position within and adjacent to an inside surface of said screen cylinder, said inlet connection and said outlet connections mounted on and opening from said outer housing tangentially with respect to the rotation of said screen cylinder and the rotation of said screen cylinder being the same as the direction of flow of fibre suspension into the annular space between said outer housing and said cylinder, and said inlet connection opening directly into said annular space.

5. An apparatus according to claim 4, wherein said screen cylinder has a vertical axis, the contoured outer surface of said screen cylinder includes ridges sloping downwardly relative to the vertical axis.

6. An apparatus as set forth in claim 5, wherein said screen cylinder has an outer surface and an inner surface the openings through said screen cylinder terminate in the outer surface in a cylindrical surface, said ridges extend outwardly from the cylindrical surface and each said ridge comprises a first surface inclined outwardly from said cylindrical surface and at an end thereof spaced outwardly from said cylindrical surface is connected to said cylindrical surface by an end surface extending substantially perpendicular to the cylindrical surface.

7. An apparatus as set forth in claim 4, wherein said openings through said screen cylinder are in the form of slots.

8. An apparatus as set forth in claim 4, wherein said openings through said screen cylinder are in the form of circular holes.

9. An apparatus as set forth in claim 4, wherein at least two said blades are located within said screen cylinder in angularly spaced relation and one of said blades is located in the range of ±10° to 45° from the reject outlet connection for selectively affording one of a positive or negative pulse.

10. An apparatus as set forth in claim 4, wherein two said blades are located in angularly spaced relation within said screen cylinder and one of said blades is spaced in the range of ±10° to 45° from said pulp inlet connection for selectively affording one of a positive or negative pressure pulse.

* * * * *